United States Patent [19]

Carlson

[11] 4,411,776

[45] Oct. 25, 1983

[54] METHOD FOR TREATING MERCAPTANS CONTAINED IN A SOUR PETROLEUM DISTILLATE

[75] Inventor: David H. J. Carlson, Park Ridge, Ill.

[73] Assignee: UOP Inc., Des Plaines, Ill.

[21] Appl. No.: 418,953

[22] Filed: Sep. 16, 1982

Related U.S. Application Data

[60] Division of Ser. No. 255,409, Apr. 4, 1981, Pat. No. 4,364,843, which is a continuation-in-part of Ser. No. 95,748, Nov. 19, 1979, abandoned, and Ser. No. 98,009, Nov. 28, 1979, abandoned.

[51] Int. Cl.$^3$ ............................................. C10G 19/073
[52] U.S. Cl. ..................................................... 208/206
[58] Field of Search ......................................... 208/206

[56] References Cited

U.S. PATENT DOCUMENTS

| | | | |
|---|---|---|---|
| 3,108,081 | 10/1963 | Gleim et al. | 252/431 N |
| 3,686,094 | 8/1972 | Laleuf et al. | 208/206 |
| 3,816,548 | 6/1974 | Williams et al. | 252/431 N |
| 4,159,964 | 7/1979 | Frame | 252/431 N |
| 4,206,079 | 6/1980 | Frame | 252/431 N |
| 4,295,993 | 10/1981 | Carlson | 208/206 |

*Primary Examiner*—Delbert E. Gantz
*Assistant Examiner*—Cynthia A. Prezlock
*Attorney, Agent, or Firm*—James R. Hoatson, Jr.; Gregory J. Mancuso; William H. Page, II

[57] ABSTRACT

A method of treating a mercaptan-containing sour petroleum distillate is disclosed which method comprises the steps of contacting the distillate at oxidation conditions with a catalytic composite comprising a metal chelate, at least about 10 wt. % of an alkali metal hydroxide, and an adsorptive support, prepared by admixing the support, metal chelate, alkali metal hydroxide, and an alcohol having fewer than about six carbon atoms, to form an admixture having less than about 25 wt. % water, and drying the admixture at a temperature of less than about 30° C.

11 Claims, No Drawings

METHOD FOR TREATING MERCAPTANS CONTAINED IN A SOUR PETROLEUM DISTILLATE

CROSS-REFERENCE TO RELATED APPLICATION

This application is a division of copending application Ser. No. 255,409 filed Apr. 4, 1981 and issued as U.S. Pat. No. 4,364,843 on Dec. 31, 1982, the teachings of which are incorporated herein by reference which is a continuation-in-part of my prior copending applications Ser. No. 95,748, filed Nov. 19, 1979, and now abandoned and Ser. No. 98,009, filed Nov. 28, 1979, and now abandoned all of the teachings of both of which are incorporated herein by reference.

BACKGROUND OF THE INVENTION

1. Field of the Invention

The field of art to which the claimed invention pertains is the processes useful for treating sour petroleum distillates. More specifically, the claimed invention relates to catalytic processes especially useful for the treatment of sour petroleum distillates to effect the oxidation of mercaptans in the distillate to disulfides.

2. Description of the Prior Art

Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. The oxidizing agent is most often air. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

A commonly used continuous process for treating sour petroleum distillates entails treating the distillate in contact with a metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air.

Sour petroleum distillates containing more difficultly oxidizable mercaptans are more effectively treated in contact with a metal chelate catalyst disposed on a high surface area adsorptive support—usually a metal phthalocyanine on an activated charcoal. The distillate is treated in contact with the supported metal chelate catalyst at oxidation conditions in the presence of an alkaline agent. The oxidizing agent is most often air admixed with the distillate to be treated, and the alkaline agent is most often an aqueous caustic solution charged continuously to the process or intermittently as required to maintain the catalyst in a caustic wetted state. (Gleim, U.S. Pat. No. 3,108,081)

The prior art has taught that in the preparation of a catalytic composite the support material is impregnated with the phthalocyanine catalyst from an aqueous solution of the catalyst, and that small amounts of an alkaline material such as sodium hydroxide can be used to increase the solubility of phthalocyanine catalyst in water. (Gleim, U.S. Pat. No. 3,108,081) The prior art has also taught that although water is the preferred solvent for the caustic which is injected into the hydrocarbon stream during the petroleum distillate treating process, other solvents such as alcohols can be employed to promote mercaptan solubility. (Gleim, U.S. Pat. No. 3,108,081) The prior art has disclosed certain catalytic composites comprising certain weakly basic materials impregnated on a solid adsorptive support. The weak bases disclosed are alkanolamine hydroxides, quaternary ammonium hydroxides, and carboxylic acids. (Frame, U.S. Pat. No. 4,159,964; Frame, U.S. Pat. No. 4,206,079; Carlson, U.S. Pat. No. 4,141,819) The art discloses that the weak bases can be impregnated on the adsorbent support from an aqueous or alcoholic solution.

What is not disclosed by the prior art is a catalytic composite comprising a metal chelate and an alkali metal hydroxide disposed on an adsorptive support wherein the composite is prepared from an alcohol admixture of support, metal chelate, and alkali metal hydoxide, wherein the admixture is dried at temperatures less than about 30° C., and wherein the resulting catalytic composite comprises at least about 10 wt. % alkali metal hydroxide. The catalytic composite of this invention can be used very effectively in the treating process of this invention with or without the necessity of addition of an alkaline agent. The consequent savings in materials handling and storage expenses, and avoidance of use of hazardous alkaline chemicals in the treating process, have been long desired.

SUMMARY OF THE INVENTION

In its broadest aspect, the present invention embodies a method of treating a mercaptan-containing sour petroleum distillate by contacting the distillate at oxidation conditions with a catalytic composite comprising a metal chelate and an alkali metal hydroxide disposed on an adsorptive support, the alkali metal hydroxide comprising at least about 10 wt. % of the catalytic composite, the catalytic composite being prepared by a method comprising first admixing an adsorptive support, a metal chelate, an alkali metal hydroxide, and an alcohol having fewer than six carbon atoms, and then drying the admixture at a temperature of less that about 30° C.

Other embodiments of this invention will become apparent in the following detailed description.

DESCRIPTION OF THE INVENTION

Any of the hydroxides of the metals of Group IA of the Periodic Chart—the alkali metal hydroxides—can be used as a component of this invention. The alkali metal hydroxide component of this invention can be a single alkali metal hydroxide, or a mixture of two or more alkali metal hydroxides. The preferred alkali metal hydroxide for use in this invention is sodium hydroxide. Potassium hydroxide is also preferred. The alkali metal hydroxides are widely available commercially. They may be made by the electrolysis of aqueous alkali-salt solutions, usually the chloride salt, or by the hydration of alkali metal hydrides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No 2,966,453, e.g. cobalt tetraphenylporphrin sulfonate; corrinoid catalysts as described in U.S. Pat. No. 3,252,892, e.g. cobalt corrin sulfonate; chelate organometallic catalysts such as described in U.S. Pat. No. 3,918,426, e.g. the condensation product of an aminophenol and a metal of Group VIII; and the like. Metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The metal phthalocyanine is most frequently employed as a derivative thereof, the commercially available sulfonated derivatives, e.g. cobalt phthalocyanine monosulfonate, cobalt phthalocyanine disulfonate or a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloracetic acid on the metal phthalocyanine.

The adsorbent support employed herein can be any of the well known solid adsorbent materials generally utilized as catalyst support or carrier material. Preferred adsorbent materials include the various charcoals produced by the destructive distillation of wood, peat, lignite, nutshells, bones, and other carbonaceous matter, and preferably such charcoals as have been heat treated or chemically treated or both, to form a highly porous particle structure of increased adsorbent capacity, and generally defined as activated carbon or charcoal. Said adsorbent materials also include the molecular sieves and the naturally occurring clays and silicates, e.g. diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the adsorbent support should be insoluble in, and otherwise inert to, the petroleum distillate at the alkaline reaction conditions existing in the treating zone. Charcoal, and particularly activated charcoal, is preferred because of its capacity for metal phthalocyanine, and because of its stability under treating conditions.

The alcohols used in this invention are alcohols having fewer than six carbon atoms per molecule. Methanol is the most preferred alcohol. Other preferred alcohols include ethanol and isopropanol. Mixtures of alcohols can also be used. The alcohol or alcohols used should be relatively water-free. A concentration of less than about 5 wt. % water is preferred. An alcohol having less than about 1 wt. % water is most preferred.

The alkali metal hydroxides of this invention, as well as the metal chelate, particularly the metal phthalocyanines, are readily disposed on the adsorbent support. The alkali metal hydroxide may comprise at least about 10 wt. % of the catalytic composite. In the sweetening process herein contemplated, the alkali metal hydroxide will preferably comprise at least about 20 wt. % of the said composite. In general, up to about 25 wt. % metal phthalocyanine can be adsorbed on the solid adsorbent support and still form a stable catalytic composite. A lesser amount in the range of from about 0.1 to about 10 wt. % generally forms a suitably active catalytic composite.

The alkali metal hydroxide and the metal chelate components can be disposed on the adsorbent support in the following manner. An admixture of the adsorptive support, metal chelate, alkali metal hydroxide, and alcohol is prepared. The admixture is then dried at a temperature of less than about 30° C. to form the catalytic composite.

This alkali metal hydroxide should comprise a sufficient portion of the admixture so that upon drying the catalytic composite comprises at least about 10 wt. % of the composite. It is preferred that the alkali metal hydroxide comprise at least about 20 wt. % of the catalytic composite. It is also preferred no base other than alkali metal hydroxide be disposed on the adsorbent support.

The disposition process can be effected utilizing conventional techniques whereby the support in the form of spheres, pills, pellets, granules or other particles of uniform or irregular size or shape, is soaked, suspended, dipped one or more times, or otherwise immersed in the alcoholic solution and/or dispersion to dispose a given quantity of the alkali metal hydroxide and metal chelate components thereon. One method involves the use of a steam-jacketed rotary dryer. The adsorbent support is immersed in the impregnating solution and/or dispersion contained in the dryer and the support is tumbled therein by the rotating motion of the dryer. Evaporation of the solution in contact with the tumbling support is expedited by applying small amounts of steam to the dryer jacket. In any case, the resulting composite is allowed to dry under ambient temperature conditions, or dried at a slightly elevated temperature in an oven, or in a flow of warm gases, or in any other suitable manner. The drying of the solution should take place at a temperature below about 30° C. It is preferred that drying be conducted at temperatures of between about 15° C. and about 25° C. Because of the maximum temperature limitation, a preferred method of evaporating the solution and drying the composite is to use a vacuum apparatus. The support, metal chelate, alkali metal hydroxide and alcohol are placed in a container to which a vacuum can be applied, and a vacuum is applied to remove the alcohol and dry the catalytic composite.

An alternative and convenient method for disposing the alkali metal hydroxide and metal chelate components on the adsorbent support comprises predisposing the support in a sour petroleum distillate treating zone or chamber as a fixed bed and passing the alkali metal hydroxide-metal chelate solution or dispersion through the bed in order to form the catalytic composite in situ. This method allows the solution or dispersion to be recycled one or more times to achieve a desired concentration of the alkali metal hydroxide and metal chelate components on the adsorbent support. In still another alternative method, the adsorbent may be predisposed in said treating zone or chamber, and the zone or chamber thereafter filled with the solution or dispersion to soak the support for a predetermined period.

A less preferred alternative of disposing the alkali metal hydroxide and metal chelate on the adsorptive support is to do so sequentially from separate solutions or dispersions. Pursuant to this alternative method, the catalytic composite of this invention is prepared by a method comprising preparing a first admixture of an adsorptive support, a metal chelate, and an alcohol or water, drying the resulting composite, preparing a second admixture of the resulting composite, alkali metal hydroxide, and an alcohol, and then drying the second admixture at a temperature of less than about 30° C. The alcohols of the first and second admixture need not be the same alcohol, although both should have fewer than six carbon atoms. The temperature of the first drying step is not critical. Any convenient temperature and means is satisfactory. Although the first admixture can comprise either water or alcohol, the amount of water in the second admixture should be minimized.

It is also possible to prepare the catalytic composite by first disposing an alkali metal hydroxide on the adsorptive support using a first admixture comprising support, alkali metal hydroxide, and alcohol, drying the admixture to form a composite, and then disposing the metal chelate on the composite using a second admixture comprising composite, metal chelate, and alcohol. Water should be minimized in both admixing steps, since use of admixture comprising substantial amounts of water would at least partially negate the advantage of using alcohol in the first admixture.

Although there are several methods of preparing the catalytic composite of this invention, they all comprise disposing the alkali metal hydroxide on the adsorbent support from an admixture of alakli metal hydroxide, alcohol, and support, and drying an admixture of support, alcohol, and alkali metal hydroxide at a temperature of less than about 30° C. In all cases it is desirable to minimize the water present in the admixture comprising alcohol, alkali metal hydroxide, and support, whether or not metal chelate also is present in that admixture. It is preferred that the amount of water in the admixture be from 0 wt. % to about 25 wt. % of the amount of alcohol present in the admixture. It is especially preferred that the amount of water in the admixture be kess than about 5 wt. % based on the amount of alcohol present in the admixture. It is most especially preferred that the amount of water in the admixture be less than about 1 wt. % of the amount of the alcohol present in the admixture.

The role of the alcohol in activating the catalytic composite of this invention is unclear. It appears that the alcohol enhances the disposition of the metal chelate or the alkali metal hydroxide, or both, on the adsorptive support. It is possible that because alcohol has a lower surface tension than water, use of an alcohol solution or disperson of metal chelate and alkali metal hydroxide instead of an aqeous solution or dispersion enables a more advantageous penetration of the adsorptive support by the alkali metal hydroxide. Since the metal chelate can be disposed on the adsorptive support via either an alcohol or water solution, it does not appear that the superior characteristics of the composite of this invention derive exclusively from an interaction between the alcohol and the metal chelate. It is theorized that an interaction of an uncertain nature occurs among the alcohol, the metal hydroxide, and the adsorptive support to unexpectedly enhance the activity and activity stability of the catalytic composite of this invention. Furthermore, as stated above, the activity of the catalytic composite decreases progressively with increasing drying temperatures. It is theorized that composite drying temperatures above about 30° C. promote the formation of high molecular weight complexes from alcohol or between alcohol and one or more other constitutents of the composite, thereby deactivating it. It appears certain that the high activity of the catalytic composite of this invention is not due to an interaction between residual alcohol on the composite and mercaptans in the distillate being treated. Although alcohols solubilize mercaptans and thereby enhance the interaction of mercaptans and the catalyst, both the activity and the activity stability of the catalytic composite of this invention are greater than would be expected as a result of a solubilizing effect from residual alcohol. In addition, after drying the catalytic composite substantially no alcohol remains on the composite. Any small amounts of residual alcohol are quickly removed from the catalytic composite by the pretroleum stream during the treating process. Thus, if a residual alcohol solubilizing effect were being observed, the activity stability of the composite would be expected to be significantly lower than that actually observed. It is understood that the foregoing explanation of the theory by which the catalytic composite operates is not intended to limit the scope of this invention.

In the process of sweetening a sour petroleum distillate, it has heretofore been the practice to oxidize the mercaptans contained therein in the presence of an alkaline agent. With respect to the method of this invention, many distillates can be treated in the absence of added alkaline agent. A sour petroleum distillate is passed in contact with the catalytic composite of this invention. The catalytic composite can be dispersed within the distillate, or it can be disposed as a fixed bed in a container. The contacting can be batch-type, or continuous. A continuous treating operation using a fixed bed of the catalytic composite is preferred. An oxidizing agent, preferably air, is introduced to contact the distillate and the catalytic composite to provide at least the stoichiometric amount of oxygen required to oxidize the mercaptan content of the distillate. It may be preferable in treating distillates with high mercaptan content to contact the catalytic composite with an alkaline agent prior to contacting the distillate and the catalytic composite.

Treatment of sour petroleum distillates with the catalytic composite of this invention can be performed in the presence of an alkaline agent as heretofore practiced, if desired. Presence of an alkaline agent, other than the alkali metal hydroxide disposed on the catalytic composite, may be desired when treating petroleum distillates having extremely high concentrations of mercaptan compounds, especially high molecular weight mercaptan compounds, or when using a catalytic composite which has been substantially deactivated through extended use. Even in these circumstances, however, it is anticipated that the amount and frequency of addition of such additional alkaline agent would be substantially less for the catalytic composite of this invention compared to conventional catalytic composites.

Typically, in using additional alkaline agent, the catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenols, cresols, and the like. Unlike the alcohol used in the preparation of the catalytic composite of this invention, the solubilizer must be present during treating and must interact with the mercaptans to be effective. The solubilizer, when employed, is preferably methanol, and the alkaline solution may suitably comprise from about 2 to about 100 vol. % thereof. Sodium hydroxide and potassium hydroxide constitute the preferred alkaline agents. Others including lithium hydroxide, rubidium hydroxide and cesium hydroxide are also suitably employed.

The method of treating of this invention can be effected in accordance with prior art treating conditions. The process is usually effected at ambient temperature conditions, although higher temperatures up to about 105° C. are suitably employed. Pressures of up to about 1000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. In fixed bed treating operations, the sour petroleum distillate may be passed upwardly of downwardly through the catalytic composite. The sour petroleum distillate may contain sufficient entrained air, but generally added air is admixed with the distillate and charged to the treating zone concurrently therewith. In some cases, it may be of advantage to charge the air separately to the treating zone and countercurent to the distillate separately charged thereto.

The following comparative and illustrative examples are presented in illustration of certain preferred embodiments of this invention and are not intended as undue limitations on the generally broad scope of the invention as set out in the appended claims. In the firxt example, a catalytic composite was prepared from a methanol solution of cobalt phthalocyanine monosulfonate and charcoal. No alkali metal hydroxide was used. In examples II and III, catalytic composites were prepared from aqueous solutions of sodium hydroxide, cobalt phthalocyanine monosulfonate, and charcoal. No alcohol was used. In examples IV and V, catalytic composites were prepared from methanol solutions of sodium hydroxide, cobalt phthalocyanine monosulfonate, and charcoal. No water was used. Example VI compares the activity and activity stability of each of the foregoing catalysts. All operations in each of the examples were performed at room temperature (about 20° C.) unless otherwise noted. Thus, examples II and IV compare high temperature evaporative techniques using water and methanol, respectively, and examples III and V compare low temperature evaporative techniques using water and methanol, respectively.

EXAMPLE I

In this comparative example, an activated charcoal supported cobalt phthalocyanine monosulfonate catalyst was prepared in accordance with conventional practice by adsorbing the cobalt phthalocyanine monosulfonate on the activated charcoal support from a methanolic dispersion thereof. Thus, 150 mg of cobalt phthalocyanine monosulfonate was admixed with 50 ml of methanol and stirred for about 5 minutes. The resulting dispersion was then further diluted to 300 ml with methanol with an additional 5 minutes of stirring. About 100 cc of the activated charcoal particles, having an apparent bulk density of about 0.25 gm/cc and a particle size in the $10 \times 30$ mesh range, was immersed in the methanol dispersion, and the dispersion was stirred in contact with the particles for about 5 minutes and then maintained in contact with the particles for 1 hour under quiescent conditions. The methanolic dispersion was thereafter evaporated to dryness over a steam bath in contact with the charcoal particles, and the resulting impregnated particles were subsequently oven dried at 100° C. for 1 hour.

EXAMPLE II

An aqueous solution of 150 ml of 7 wt. % sodium hydroxide (i.e. 11.24 gm of sodium hydroxide in water) was admixed with 150 mg of cobalt phthalocyanine monosulfonate and 100 cc of activated charcoal having an apparent bulk density of about 0.25 gm/cc and a particle size in the $10 \times 30$ mesh range. The admixture was stirred for about 5 minutes and then maintained at ambient temperature under quiescent conditions for about one-half hour. The admixture was thereafter evaporated to dryness over a steam bath, to recover a composite.

EXAMPLE III

An aqueous solution of 150 ml of 7 wt. % sodium hydroxide was admixed with 150 mg of cobalt phthalocyanine monosulfonate and 100 cc of activated charcoal having an apparent bulk density of about 0.25 gm/cc and a particle size in the $10 \times 30$ mesh range. The admixture was stirred for about 5 minutes and then maintained at quiescent conditions for about one-half hour. The admixture was thereafter evaporated to dryness at room temperature (about 20° C.), to recover a composite.

EXAMPLE IV

A methanol solution of 150 ml of 7 wt. % sodium hydroxide (i.e. 11.24 gm of sodium hydroxide in methanol) was admixed with 150 mg of cobalt phthalocyanine monosulfonate and 100 cc of activated charcoal having an apparent bulk density of about 0.25 gm/cc and a particle size in the $10 \times 30$ mesh range. The admixture was stirred for about 5 minutes and then maintained at ambient temperature under quiescent conditions for about one-half hour. The admixture was thereafter evaporated to dryness over a steam bath, to recover a composite.

EXAMPLE V

This example illustrates one embodiment of this invention. A methanol solution of 150 ml of 7 wt. % sodium hydroxide was admixed with 150 mg of cobalt phthalocyanine monosulfonate and 100 cc of activated charcoal having an apparent bulk density of 0.25 gm/cc and a particle size in the 10×30 mesh range. The admixture was stirred for about 5 minutes and then maintained at ambient temperature under quiescent conditions for about one-half hour. The admixture was thereafter evaporated to dryness at room temperature (about 20° C.), to recover a composite.

EXAMPLE VI

A comparative evaluation of the catalytic composites of the foregoing examples was effected in the following manner. This example illustrates another embodiment of this invention. In each case, 100 cc of the catalyst was disposed as a fixed bed in a vertical glass tubular reactor maintained at ambient temperature conditions—about 20° C. Air was charged to the system through a rotameter at about 200 cc per hour and admixed with a sour kerosene feedstock. The mixture was processed downwardly through the catalyst bed at a liquid hourly space velocity of about 1. The reactor effluent was monitored and analyzed periodically for mercaptan sulfur.

The results of the comparative evaluation are set forth in Table I. Columns IA and IB correspond to the composite of Example I. One sample of that composite was tested after the composite bed had been wetted with an aqueous 7 wt. % sodium hydroxide solution, to simulate typical operating conditions. That test is shown in column IB of Table I. Another sample of the composite of example I was tested without exposure to any caustic, to provide a caustic-free control example. The results are shown in column IA of Table I.

Columns II and III of Table I compare the results of evaluations of catalysts prepared in examples II and III, respectively. Columns IV and V compare the results of evaluations of examples IV and V, respectively.

The higher activity and activity stability of the catalytic composite of this invention are clear from Table I. Column V represents an embodiment of this invention. At every period of the test runs, the embodiment was significantly more active than the comparative examples. In fact, the embodiment was the only catalytic composite which was able to sweeten the sour kerosene being treated. The treated product of the run using the embodiment remained sweet (less than about 10 ppm mercaptan sulfur) until the 60 hour period analysis. Over the first 20 hours of the run, the embodiment produced a product of uniformly low mercaptan level.

TABLE I

| | Mercaptan Sulfur, wt. ppm. | | | | | | |
|---|---|---|---|---|---|---|---|
| | Alcohol - no caustic | | Water - caustic | | Alcohol - caustic | | |
| | | | | | | V (low T) | |
| | IA | IB | II | III | IV | | |
| Time, Hrs. | (no prewash) | (prewash) | (high T) | (low T) | (high T) | (1) | (2) |
| 0 | 1028 | 1028 | 1087 | 1087 | 1087 | 1087 | 1087 |
| 1 | 372 | 20 | 70 | — | 46 | 4 | — |
| 2 | — | — | — | 11 | — | — | — |
| 5 | 475 | 47 | 50 | — | 95 | 3 | — |
| 6 | — | — | — | 25 | — | — | — |
| 10 | 500 | 51 | 20 | — | 103 | 3 | — |
| 15 | 496 | 50 | 19 | — | 110 | 4 | — |
| 16 | — | — | — | 34 | — | — | — |
| 20 | 500 | 53 | 23 | 33 | 122 | 4 | 8 |
| 30 | | | | 26 | | | 8 |
| 40 | | | | 47 | | | 6 |
| 60 | | | | 63 | | | 10 |
| 70 | | | | 72 | | | 12 |
| 76 | | | | 80 | | | 15 |
| 78 | | | | 81 | | | 16 |
| 80 | | | | 84 | | | 22 |

The comparative examples did not.

To verify the absence of alcohol on the catalytic composite after drying, the treated kerosene product was tested for its flash point at several intervals during a run. Alcohol remaining on the catalytic composite and influencing the treating operation would be leached from the catalytic composite by the kerosene being treated and would be present in the treated kerosene product. Table II shows the results of the flash tests. The column labelled "High T dried" shows the flash points of the kerosene product using the catalytic composite of example IV in the treating process of example VI. The column labelled "Low T dried" shows the flash points of the kerosene product using the catalytic composite of example V in the treating process of example VI. The results indicate that alcohol was removed equally completely by ambient temperature drying and by high temperature drying. The results support the conclusion that the superior results of catalytic composite of this invention arise from a unique composition and method of preparation of the composite, and not from the presence of free alcohol in the system during hydrocarbon treating.

TABLE II

| | Flash Points, °C. | |
|---|---|---|
| Time, Hrs. | (High T dried) | (Low T dried) |
| 5 | 57 | 56 |
| 10 | 57 | 54 |
| 15 | 57 | 53 |
| 20 | 57 | 56 |

I claim:

1. A method of treating a mercaptan-containing sour petroleum distillate by contacting said distillate at oxidation conditions with a catalytic composite comprising a catalytically effective amount of a metal phthalocyanine and an alkali metal hydroxide disposed on an adsorptive support, said alkali metal hydroxide comprising at least about 10 wt. % of said catalytic composite, said catalytic composite being prepared by a method which comprises:
(a) preparing an admixture of an adsorptive support, a metal phthalocyanine, an alkali metal hydroxide, and an alcohol having fewer than six carbon atoms, said admixture also containing from 0 wt. % to about 25 wt. % water based on the weight of said alcohol; and
(b) drying said admixture at a temperature of less than about 30° C. to form a catalytic composite.

2. The method of claim 1 wherein said treating is conducted without addition to said distillate of a base other than said alkali metal hydroxide disposed on said adsorptive support.

3. The method of claim 1 wherein said admixture contains less than about 5 wt. % water based on the weight of said alcohol.

4. The method of claim 1 wherein said alkali metal hydroxide comprises at least about 20 wt. % of said composite.

5. The method of claim 1 wherein said alkali metal hydroxide is sodium hydroxide.

6. The catalytic composite of claim 1 wherein said alkali metal hydroxide is potassium hydroxide.

7. The catalytic composite of claim 1 wherein said adsorptive support is an activated charcoal.

8. The method of claim 1 wherein said metal phthalocyanine is a cobalt phthalocyanine.

9. The method of claim 1 wherein said metal phthalocyanine is a vanadium phthalocyanine.

10. The method of claim 1 wherein said metal phthalocyanine is cobalt phthalocyanine monosulfonate.

11. The catalytic composite of claim 1 wherein said solvent is methanol.

* * * * *